(12) United States Patent
Aoyama

(10) Patent No.: US 8,164,653 B2
(45) Date of Patent: Apr. 24, 2012

(54) IMAGE-PROCESSING DEVICE FOR RECORDING IMAGE DATA WITH CONSECUTIVE-PHOTOGRAPHING AND A CONTROLLING METHOD THEREOF

(75) Inventor: Satoshi Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 11/456,702

(22) Filed: Jul. 11, 2006

(65) Prior Publication Data

US 2007/0030358 A1   Feb. 8, 2007

(30) Foreign Application Priority Data

Jul. 19, 2005   (JP) ................................. 2005-209156

(51) Int. Cl.
*H04N 5/76* (2006.01)
(52) U.S. Cl. .................. 348/231.2; 348/231.9
(58) Field of Classification Search ............... 348/231.2, 348/231.3, 231.6, 231.9
See application file for complete search history.

(56) References Cited

U.S. PATENT DOCUMENTS

| 5,487,047 A | | 1/1996 | Oka | |
|---|---|---|---|---|
| 5,859,666 A | * | 1/1999 | Manabe | 348/231.9 |
| 6,415,102 B1 | * | 7/2002 | Fujii et al. | 386/117 |
| 6,744,465 B1 | * | 6/2004 | Tomikawa | 348/231.2 |
| 6,833,866 B1 | * | 12/2004 | Suzuki | 348/231.2 |
| 7,016,091 B2 | * | 3/2006 | Kurakata | 358/524 |
| 7,089,271 B1 | * | 8/2006 | Kihara et al. | 1/1 |
| 7,356,249 B2 | * | 4/2008 | Ota et al. | 386/248 |
| 7,418,601 B2 | * | 8/2008 | Okamoto | 713/193 |
| 7,426,606 B2 | * | 9/2008 | Chu | 711/103 |
| 7,542,078 B2 | * | 6/2009 | Okusa | 348/231.2 |
| 2004/0196388 A1 | * | 10/2004 | Kaku | 348/231.7 |
| 2008/0211927 A1 | * | 9/2008 | Nozaki et al. | 348/231.7 |

FOREIGN PATENT DOCUMENTS

| JP | H05-314726 A | 11/1993 |
|---|---|---|
| JP | H10-334590 A | 12/1998 |
| JP | 11-136627 A | 5/1999 |
| JP | 2002-032975 A | 1/2002 |
| JP | 2003-018537 A | 1/2003 |
| JP | 2004-078408 A | 3/2004 |

* cited by examiner

*Primary Examiner* — Jason Chan
*Assistant Examiner* — Gary C Vieaux
(74) *Attorney, Agent, or Firm* — Canon USA, Inc., I.P. Division

(57) ABSTRACT

An image-processing device generates image data in consecutive-photographing mode and stores the image data and file-management information in a removable recording medium. Data on images photographed consecutively is stored in an internal memory of a device in sequence and written into the removable recording medium in sequence. To reduce the number of writing data into the removable recording medium while in the consecutive-photographing mode, the file-management information used for managing a file including the image data is written into the removable recording medium only when a predetermined condition is satisfied while the file-management information is stored and updated in the internal memory.

4 Claims, 7 Drawing Sheets

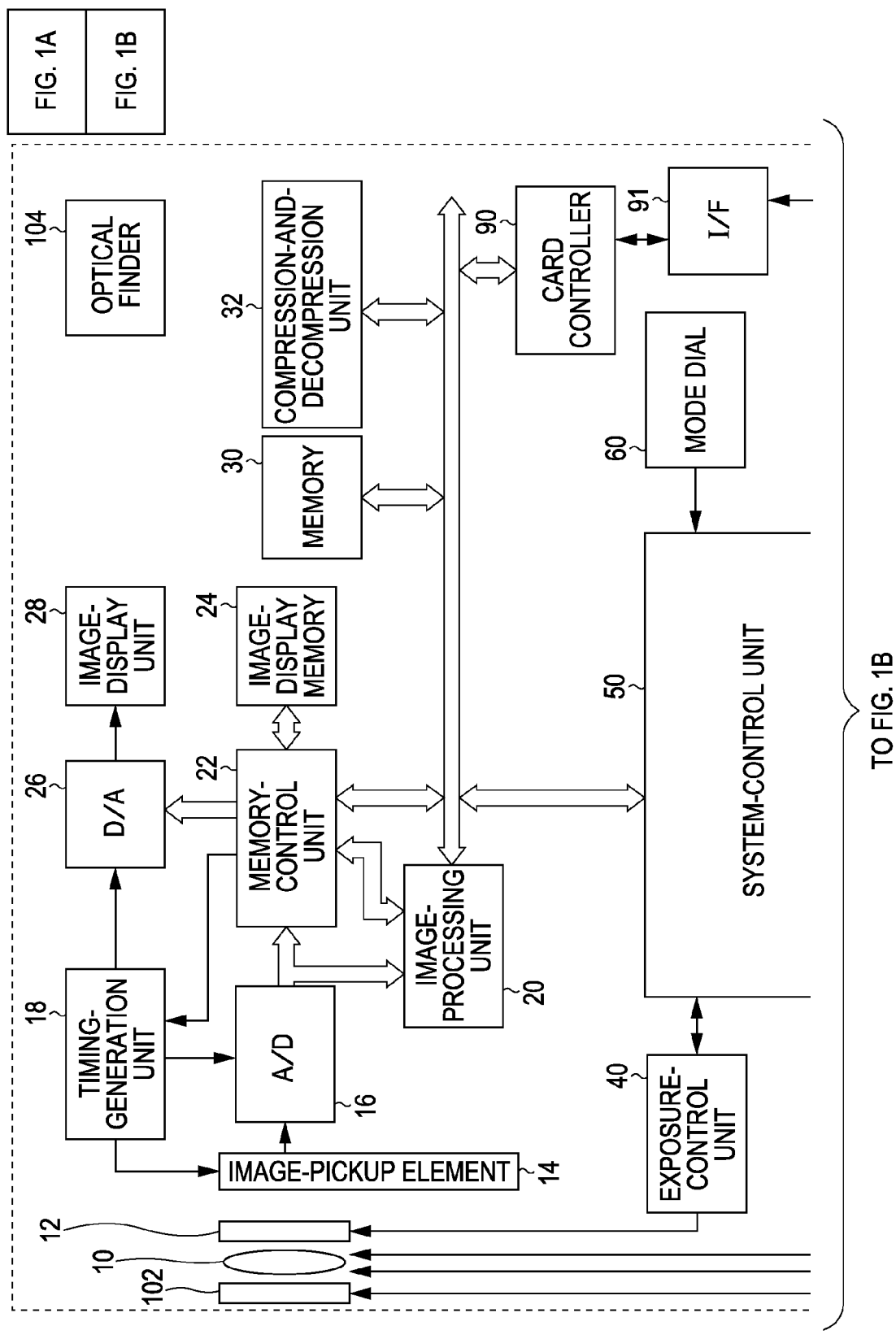

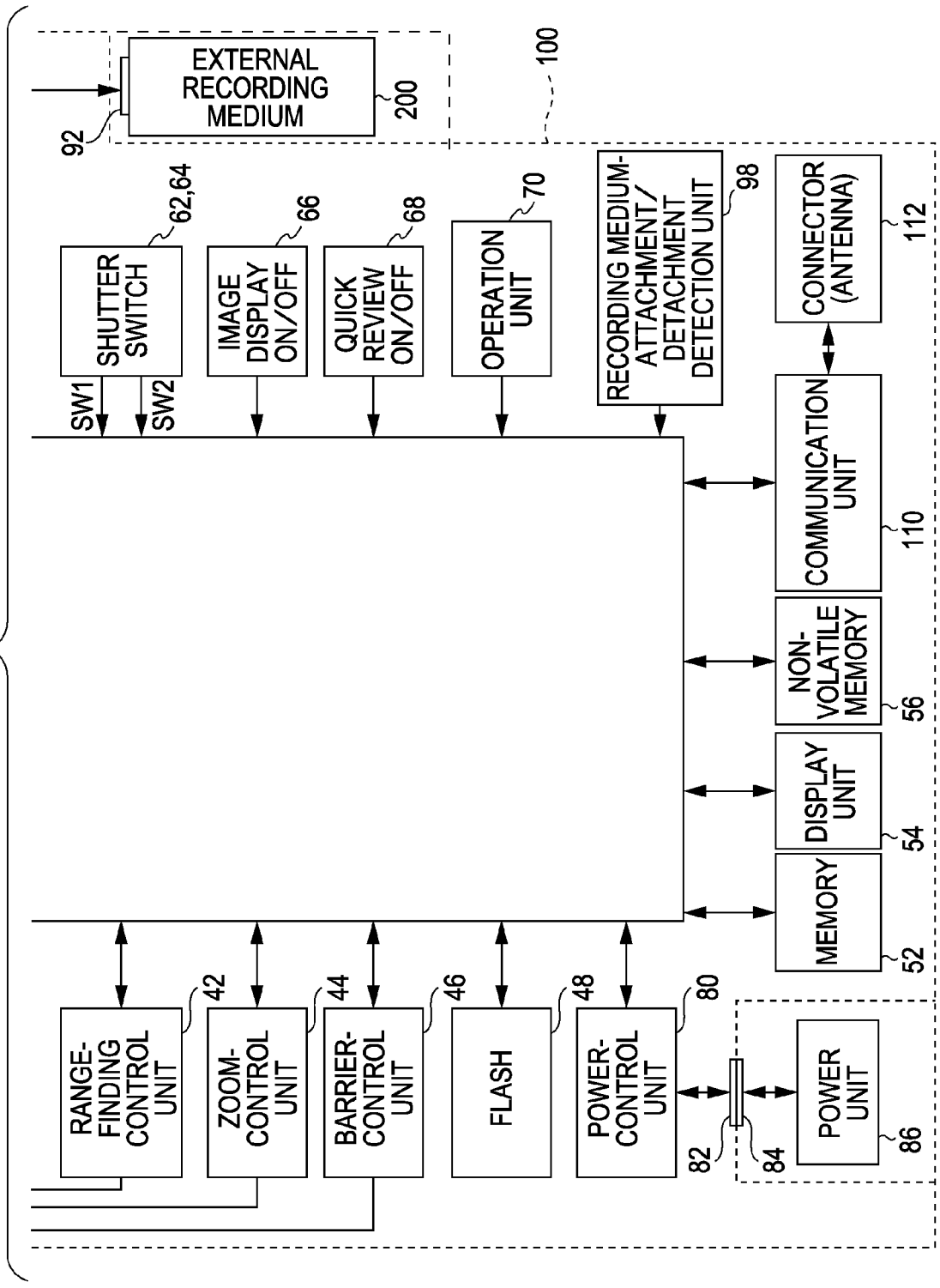

Prior Art

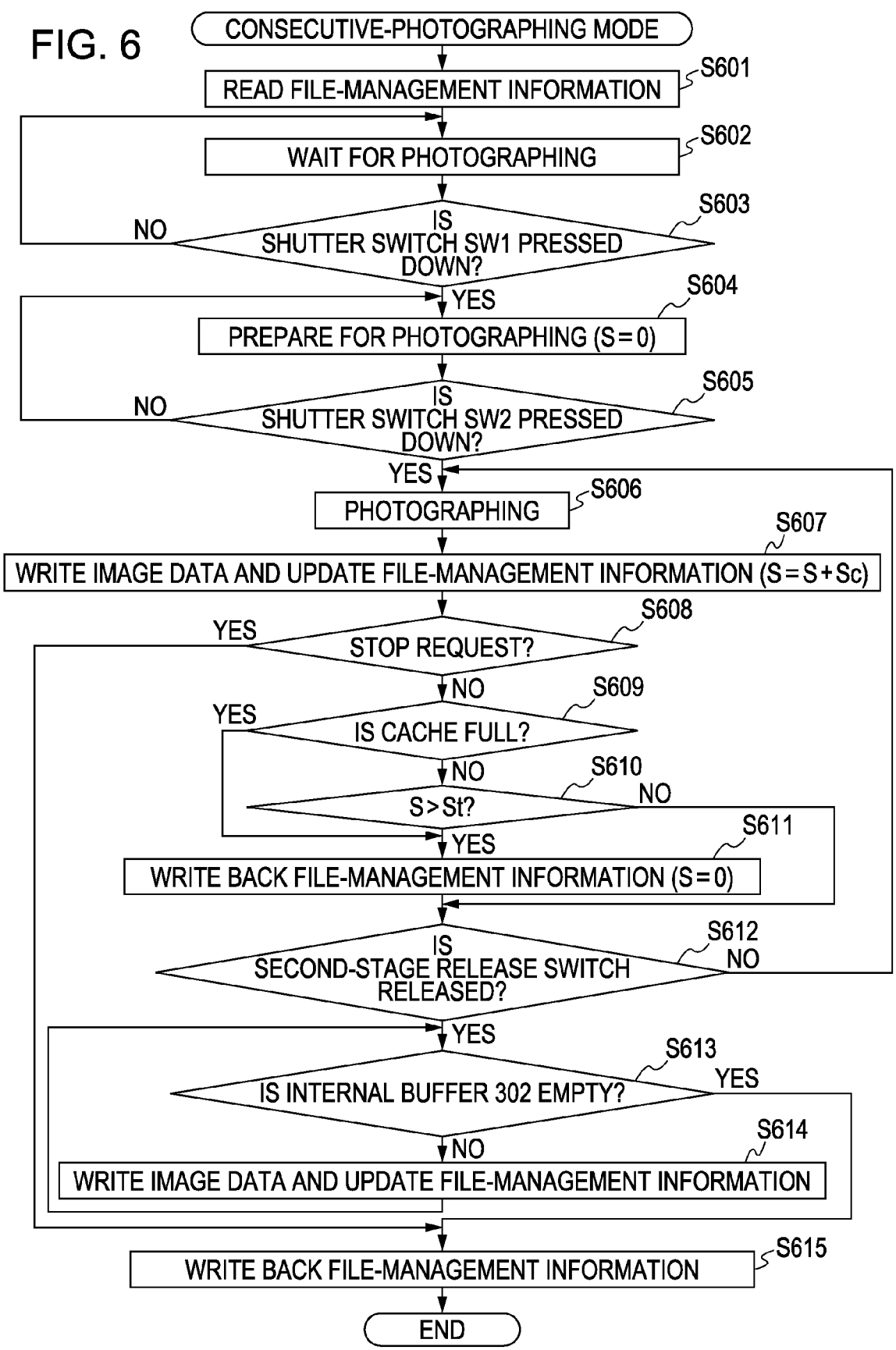

IMAGE-PROCESSING DEVICE FOR RECORDING IMAGE DATA WITH CONSECUTIVE-PHOTOGRAPHING AND A CONTROLLING METHOD THEREOF

BACKGROUND OF THE INVENTION

1. Field of the Invention

The present invention relates to an image-processing device, a method for controlling the image-processing device, a computer program, and a storage medium.

2. Description of the Related Art

In various circumstances, it is desired that digital cameras operate with high speed, allowing a user to operate the digital camera and photograph an image according to the user's will at the moment when the user wants to photograph the image. It is further desired that the digital camera responds to the user so that the user can operate the digital camera without stress. Particularly, in consecutive-photographing mode which allows for the user to photograph images consecutively while a release button is pressed down, a file including data on the photographed images needs to be stored in an external recording medium till a photograph instruction transmitted from the user expires.

In the case where the above-described digital camera is used, when storing the image-data file into the external recording medium, the image-data file is temporarily accumulated in an internal buffer of an internal memory, where the internal buffer is used for storing the image-data file. Then, the image-data file is transmitted from the internal memory to the external recording medium so that the image-data file is written and stored in the external recording medium. However, since the size of the internal buffer is limited, if a large number of images are photographed in the consecutive-photographing mode, the internal buffer overflows with the image data. In that case, the user is required to wait to photograph till the internal buffer has available space.

The consecutive-photographing mode allows the user to photograph images smoothly at the beginning, that is, as long as the number of the photographed images does not exceed a predetermined number, as disclosed in Japanese Patent Laid-Open No. 11-136627 and/or Japanese Patent Laid-Open No. 2003-018537. However, since the data corresponding to several images is written afterwards, the user has to wait to perform photographing during the data-writing period.

Further, if data is written into the external recording medium with low speed and the size of the image-data file is large, the internal buffer overflows with the image data, even though the digital camera is provided, as a system which can store data into the external recording medium at the same time as when the photographing is performed. Subsequently, the user has to wait till the internal buffer has free space for the next image-data file.

Usually, a file-allocation-tables (FAT) system is used, as a file system configured in the external recording medium. The outline of the FAT system is shown in FIG. 2.

A management region 209 including a master-boot recorder (MBR) 201, a boot sector 202, and a FAT 203 is provided in a head region of the FAT system. Basic information relating to the file system is written into the management region 209, where the basic information includes information indicating the data-region size, a cluster size showing the minimum unit of logical data storing performed on storage, and so forth.

A data region 210 is provided next to the management region 209. Usually, a file is stored in the data region 210 including a directory entry 211 and main-body data 213 of the image data file. Here, the directory entry 211 includes information about the image data, where the information indicates the name of the image-data file, the photographing date, the attribute, the start-cluster number of the main-body data 213, the data size, and so forth. A group of the directory entries 211 is referred to as a directory-entry block 212.

Here, an example of a basic method for acquiring a predetermined image file (IMG_0001.JPG) by using the FAT system will be described.

First, the file system finds the directory-entry block 212 including the directory entry 211 of each image-data file, and compares the character string of the name of a file for acquisition and the character strings of the file names of the directory entries 212 in sequence, so as to find the file for acquisition.

If the directory entry 211 including the file for acquisition is detected, the start cluster thereof is acquired. Then, information about a cluster chain relating to what cluster is used by the file for acquisition is obtained by referring to a table of the FAT 203 on the basis of the acquired start cluster. Here, according to the directory entry 211, the start cluster of the image file IMG_0001.JPG is determined to be three. Then, referring to the FAT 203, four clusters including clusters 3, 4, 5, and 6 are used. Since each of the clusters corresponds to 16 kilobytes (KB), the expression 16 KB*4=64 KB holds. Thus, it is identified that the image file IMG_0001.JPG is provided in the clusters 3 to 6, and the part corresponding thereto is read, so that the file for acquisition can be acquired.

On the contrary, when storing a predetermined file into the external recording medium, the predetermined file is opened. When the file is opened, the name of the file (IMG_0001.JPG) is registered with the directory entry 211, so as to store the file. At that time, however, since the start cluster and the file size are not yet determined, the space corresponding thereto is left blank. Next, contents of the file are written into the data region 210. However, the FAT may be updated according to the data size, as required. When the data writing is finished, the file is closed. When the file is closed, information about the start cluster and the file size that was not determined at the time of file opening is written into the directory entry 211 and data writing is performed for the FAT 203.

Thus, when storing a file, data writing for the directory entry 211 (file opening), data writing for the data region 210, and data writing for the directory entry 211 and data writing for the FAT 203 (file closing) are performed. That is to say, four separate data writing operations are required to write the data file corresponding to a single image into the external recording medium.

Therefore, when photographing is performed over N times in the consecutive-photographing mode, the number of data writing operations required to be performed is at least N×4 times. Data can be written into the external recording medium with high speed as long as the regions of the external recording medium are provided consecutively. When writing a file into the external recording medium, however, the data-write positions are often scattered. Namely, the data writing is performed for each of the directory entry 211, the FAT 203, and the data region 210, which causes overhead, so as to specify the data-write positions (remapping) while processing is performed in the external recording medium.

Accordingly, it is desired to reduce the number of writing data into an external recording medium when an image-data file is stored into the external recording medium in consecutive-photographing mode, so that data can be written into a file system with efficiency.

SUMMARY OF THE INVENTION

According to an aspect of the present invention, an embodiment is directed to an image-processing device having an image-pickup unit that senses an image and generates image data. A removable recording medium can be removably coupled to the image-processing device. The removable recording medium is employed to store the image data and file-management information used for managing a file including the image data. The image-processing device includes a write-and-read control unit, a first storage unit, a second storage unit and a file-control unit. The write-and-read control unit writes data into and reads data from the removable recording medium. The first storage unit stores image data in sequence, where the image data is consecutively generated by the image-pickup unit. The second storage unit stores the file-management information that is readable by the write-and-read control unit and that is stored in the removable recording medium. The file-control unit performs control so that the write-and-read control unit writes the image data stored in the first storage unit into the removable recording medium in sequence and the file-management information stored in the second storage unit is updated based on the written data. When a predetermined condition is satisfied, the file-control unit instructs the write-and-read control unit to write the updated file-management information into the removable recording medium.

Further features of the present invention will become apparent from the following description of exemplary embodiments (with reference to the attached drawings). It is noted that the references to "an" or "one" embodiment of this disclosure are not necessarily directed to the same embodiment, and such references mean at least one.

BRIEF DESCRIPTION OF THE DRAWINGS

FIG. 1 is a block diagram showing an example configuration of an image-processing device according to an embodiment of the present invention.

FIG. 6 is a flowchart showing example processing performed in the consecutive-photographing mode corresponding to a third embodiment of the present invention.

DESCRIPTION OF THE EMBODIMENTS

Figure 2:
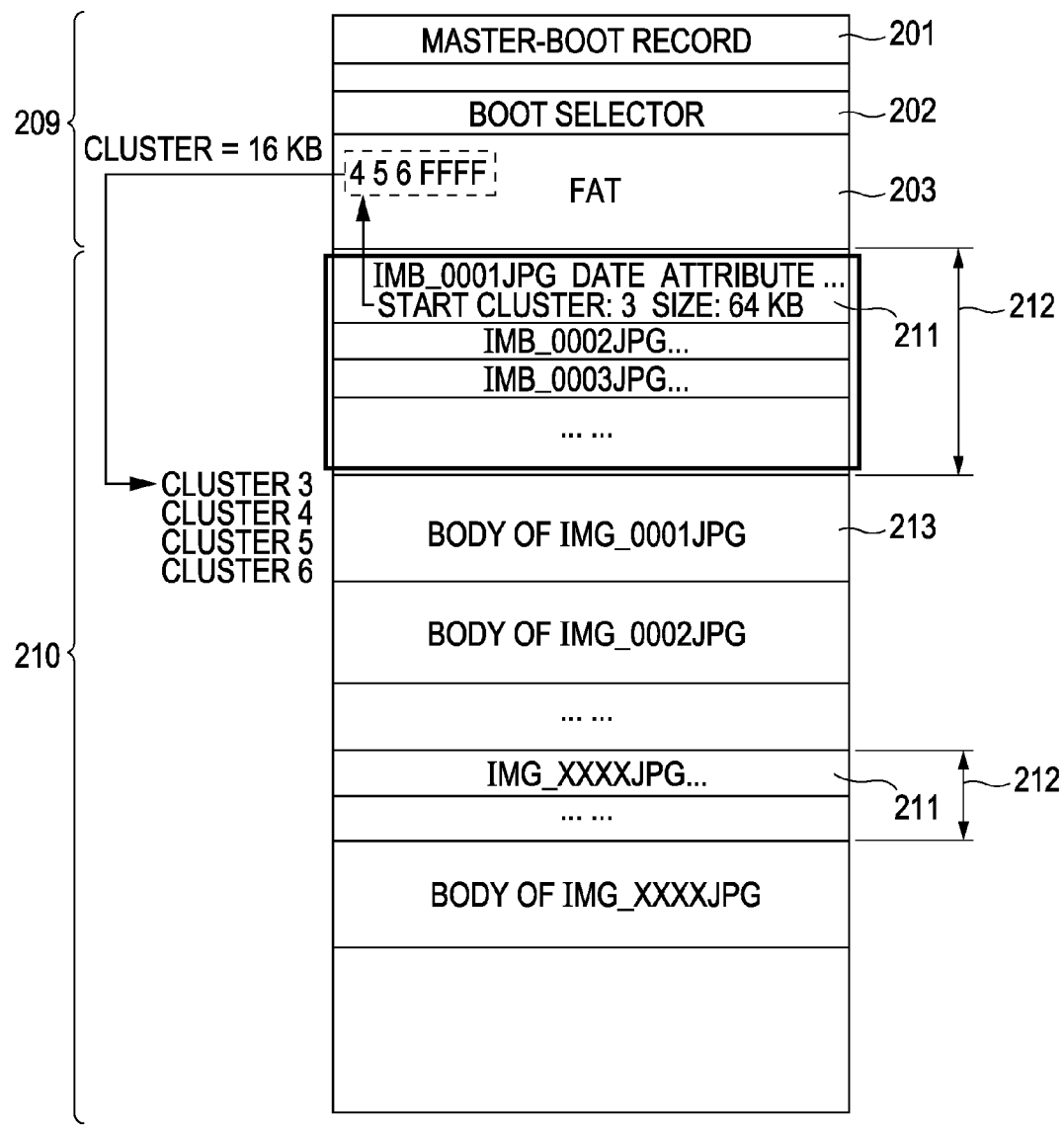
FIG. 2 is a diagram showing an outline of a file system.

Hereinafter, embodiments of the present invention will be described with reference to the attached drawings.

FIG. 1 shows an example configuration of a digital camera provided, as an image-processing device according to an embodiment of the present invention. In FIG. 1, reference numeral 100 denotes a main body of the digital camera, reference numeral 10 denotes a photographic lens, reference numeral 12 denotes a shutter with an aperture function, reference numeral 14 denotes an image-pickup element which converts an optical image into an electric signal, and reference numeral 16 denotes an analog-to-digital (A/D) converter which converts an analog signal transmitted from the image-pickup element 14 into a digital signal.

Reference numeral 18 denotes a timing-generation unit which transmits a clock signal and/or a control signal to each of the image-pickup element 14, the A/D converter 16, and a digital-to-analog (D/A) converter 26 under the control of a memory-control unit 22 and a system-control unit 50. Reference numeral 20 denotes an image-processing unit which performs predetermined pixel-interpolation and/or color conversion for data transmitted from the A/D converter 16 and/or the memory-control unit 22.

The image-processing unit 20 performs predetermined calculation by using data on a picked-up image. The system-control unit 50 controls an exposure-control unit 40 and a range-finding control unit 42 on the basis of the calculation result, and performs autofocus (AF) processing, autoexposure (AE) processing, and flash preliminary-light-emission (EF) processing under the through-the-lens (TTL) system.

Further, the image-processing unit 20 performs predetermined calculation by using the picked-up image data and performs auto white balance (AWB) processing under the TTL system on the basis of the calculation result.

The memory-control unit 22 controls the A/D converter 16, the timing-generation unit 18, the image-processing unit 20, an image-display memory 24, the D/A converter 26, a memory 30, and a compression-and-decompression unit 32. Output data transmitted from the A/D converter 16 is written into the image-display memory 24 and/or the memory 30 via the image-processing unit 20 and the memory-control unit 22, or the memory-control unit 22 alone.

Reference numeral 28 denotes an image-display unit including a thin-film transistor (TFT), liquid-crystal display (LCD), and so forth. Data on a display image written into the image-display memory 24 is produced by the image-display unit 28 via the D/A converter 26.

In the digital camera 100, an electronic-finder function can be achieved by sequentially producing data on picked-up images through the image-display unit 28. Further, the image-display unit 28 can turn on and/or off the produced image arbitrarily according to an instruction transmitted from the system-control unit 50. If the produced image is turned off, the power consumption of the digital camera 100 can be reduced significantly.

The memory 30 stores data on a photographed still image and/or video, and has a storage capacity sufficient for storing a predetermined number of still images and the video corresponding to a predetermined time. Subsequently, it becomes possible to write high-speed and high-volume image data into the memory 30 while consecutive photographing and/or panoramic photographing is performed. The consecutive photographing is performed to photograph a plurality of still images consecutively. Further, the memory 30 can be used, as a work area of the system-control unit 50.

The compression-and-decompression unit 32 compresses and/or decompresses image data, for example, by performing adaptive-discrete-cosine transform (ADCT) or the like, so as to read image data stored in the memory 30, and compress and/or decompress the image data. The compressed and/or decompressed image data is written back into the memory 30.

The exposure-control unit 40 controls the shutter 12 having the aperture function and operates in conjunction with the flash 48 to provide a flash-light-control function. The range-finding control unit 42 controls focusing of the photographic lens 10. Reference numeral 44 denotes a zoom-control unit which controls zooming performed by the photographic lens 10, and reference numeral 46 denotes a barrier-control unit which controls operations performed by a protection unit 102 provided, as a barrier.

The flash 48 has a function of projecting an AF-auxiliary light and the flash-light-control function. Each of the exposure-control unit 40 and the range-finding-control unit 42 is controlled under the TTL system. The image-processing unit 20 performs calculation for data on a picked-up image and the system-control circuit 50 controls the exposure-control unit 40 and the range-finding control unit 42 on the basis of a result of the calculation performed by the image-processing unit 20. The system-control circuit 50 controls the entire digital camera 100. Reference numeral 52 denotes a memory which stores information about a constant, a variable, a program, and so forth that are used for operations performed by the system-control circuit 50.

Reference numeral 54 denotes a display unit which includes a liquid-crystal display, a speaker, and so forth, so as to produce a screen image showing the operation state, a message, and so forth by using text, an image, speech, and so forth according to the program executed by the system-control unit 50. The display unit 54, or a plurality of the display units 54 is installed at at least one a predetermined position near the operation unit of the digital camera 100, so that a user can readily see the display unit 54. The display unit 54 is provided, as a combination of an LCD, a light-emitting diode (LED), a sounding element, and so forth. Further, part of the functions of the display unit 54 is provided in an optical finder 104. Of display contents produced by the display unit 54, the LCD or the like can produce a single-shot display image and/or consecutively photographed display images, a self-timer display image, a compression-rate display image, a record-pixel-number display image, a recorded-image-number display image, a remaining-photographable-image-number display image, a shutter-speed display image, the f/stop display image, and an exposure-correction display image. The LCD or the like can further produce a flash display image, a red-eye-effect reduction display image, a macro-photographing display image, a beeper-setting display image, a clock-battery-remaining-amount display image, a battery-remaining-amount display image, an error-display image, a display image showing information provided, as a number of at least two digits, a display image showing the attached/detached state of an external recording medium 200, a communication-interface (I/F) operation display image, a date-and-time display image, and so forth. Of display contents produced by the display unit 54, a focusing display image, a hand shake-warning display image, a flash-charging display image, a shutter-speed display image, an f-stop-number display image, an exposure-correction display image, and so forth are produced in the optical finder 104.

Reference numeral 56 denotes a non-volatile memory that can electrically delete and/or record data, such as an electrically erasable and programmable read-only memory (EE-PROM). Each of reference numerals 60, 62, 64, 66, 68, and 70 denotes an operation unit provided, so as to transmit various operation instructions for the system-control unit 50. Each of the operation units 60 to 70 is provided, as a single device, or a combination of devices. Each of the devices may be a switch and/or a dial, a touch panel, a pointing device which detects a line of sight, a speech-identification device, and so forth. Hereinafter, each of the above-described operation units 60 to 70 will be described in detail.

The operation unit 60 is provided, as a mode-dial switch which can set and switch between various function modes including a power-off mode, an automatic-photographing mode, a photographing mode, a panoramic-photographing mode, a reproduction mode, a multi-screen reproduction-and-deletion mode, a PC-connection mode, and so forth. The operation unit 62 is provided, as a shutter switch SW1 which is turned on while a predetermined shutter button (not shown) is operated. The operation unit 62 instructs to start operations including autofocus (AF) processing, autoexposure (AE) processing, auto white balance (AWB) processing, flash preliminary light emission (EF) processing, and so forth.

The operation unit 64 is provided, as a shutter switch SW2 which is turned on when an operation of a shutter button (not shown) is finished so that an instruction is issued, so as to start a series of processing procedures, as below. The processing procedures include exposure processing performed, so as to write a signal read from the image-pickup element 12 into the memory 30 via the A/D converter 16 and the memory-control unit 22, as image data. The processing procedures further include development processing performed by using information obtained by calculation performed by the image-processing unit 20 and/or the memory-control unit 22. Still further, the processing procedures include record processing performed so that the image data read from the memory 30 is compressed by the compression-and-decompression unit 32 and written into a recording medium 200.

The operation unit 66 is provided, as an image-display ON/OFF switch which can turn the image-display unit 28 on and/or off. Subsequently, when photographing is performed by using the optical finder 104, power transmitted to the image-display unit 28 including the TFT, the LCD, and so forth can be interrupted, which reduces the amount of power consumption.

The operation unit 68 is provided, as a quick-review ON/OFF switch configured to set a quick-review function which allows for automatically reproducing data on a photographed image immediately after the photographing is finished. In the above-described embodiment, the quick-review ON/OFF switch 68 is configured to set the quick-review function when the image-display unit 28 is turned off.

The operation unit 70 includes various types of buttons, a touch panel, and so forth. Namely, the operation unit 70 includes a menu button, a set button, a macro button, a multi-screen reproduction-and-page break button, a flash-setting button, a single shot/consecutive shot/self-timer-switch button, and a menu-moving + (plus) button, for example. The operation unit 70 further includes a menu-moving − (minus) button, a reproduced-image moving + (plus) button, a reproduced image − (minus) button, a photographed-image-quality selection button, an exposure-correction button, a date/time-setting button, and so forth.

Reference numeral 80 denotes a power-control unit which includes a battery-detection unit, a DC-DC converter, a switch unit configured to switch between blocks, so as to change from one block to another block to which power is applied, and so forth. The power-control unit 80 detects information about whether or not a battery is mounted, the battery type, and the remaining amount of the battery. Then, the power-control unit 80 controls the DC-DC converter on the basis of the detection result and an instruction transmitted from the system-control unit 50 so that a necessary voltage is transmitted to each of the above-described units including the external recording medium 200 over a required time period.

Each of reference numerals 82 and 84 denotes a connector, and reference numeral 86 denotes a power unit including a primary battery such as an alkaline battery and a lithium battery, a secondary battery including a nicad (NiCd) battery, a nickel-metal hydride (NiMH) battery, a lithium-ion battery, and so forth, and an AC adapter, for example.

Reference numeral 90 denotes a card controller which transmits and/or receives data to/from the external recording medium 200 such as a memory card, reference numeral 91 denotes an interface between the external recording medium and the digital camera 100, and reference numeral 92 denotes a connector which connects to the external recording medium 200 such as the memory card. Reference numeral 98 denotes a recording-medium attachment/detachment detection unit which detects whether or not the external recording medium 200 is attached to the connector 92. In the above-described embodiment, at least one interface and/or connector is provided, where a recording medium configured to store image data is attached to the interface and/or the connector. Further, an interface and a connector on different standards may be used in combination.

For example, each of the interface 91 and the connector 92 may adhere to a predetermined standard, as is the case with a personal-computer-memory-and-international-association (PCMCIA) card, a CompactFlash ((CF) registered trademark) card, and so forth. In that case, various types of communication cards may be connected to the interface 91 and/or the connector 92. Namely, a local-area-network (LAN) card, a modem card, a universal-serial-bus (USB) card, Institute of Electrical and Electronics Engineers (IEEE) 1394 card, a P1284 card, a small-computer-systems-interface (SCSI) card, a personal handyphone system (PHS), and so forth can be connected to the interface 91 and/or the connector 92. Further, it becomes possible to transfer and/or receive image data and/or management information attached to the image data between the digital camera 100 and a peripheral device including another computer, a printer, and so forth.

The protection unit 102 is provided, as a barrier which covers an image-pickup unit of the digital camera 100, the image-pickup unit including the photographic lens 10, so as to prevent the image-pickup unit from being soiled and/or damaged. The optical finder 104 is provided so that the user can make an exposure only by using the optical finder 104 without using the electronic-finder function presented by the image-display unit 28. The optical finder 104 has part of functions of the display unit 54. Namely, the focusing display image, the hand-shake-warning display image, the flash-charging display image, the shutter-speed display image, the f-stop-number display image, the exposure-correction display image, and so forth are set in the optical finder 104.

The external recording medium 200 (also herein referred to as "removable recording medium") may be provided, as a memory card that can be attached and/or detached to/from the digital camera 100. A communication unit 110 performs various types of communications including an RS-232C-compliant communication, a communication achieved via a universal serial bus (USB), a communication compliant to the institute of Electrical and Electronics Engineers (IEEE) 1394, a communication compliant to the IEEE P1284, a communication achieved via a small computer system interface (S·CSI), a communication achieved via a modem, a communication achieved via a local-area network (LAN), a wireless communication, and so forth. A connector (an antenna when the wireless communication is performed) 112 connects the digital camera 100 to another device via the communication unit 110.

Next, example processing procedures performed in the consecutive-photographing mode corresponding to an embodiment of the present invention will be described with reference to FIG. 3. The processing procedures are performed, so as to store data in the external recording medium 200.

Figure 3:
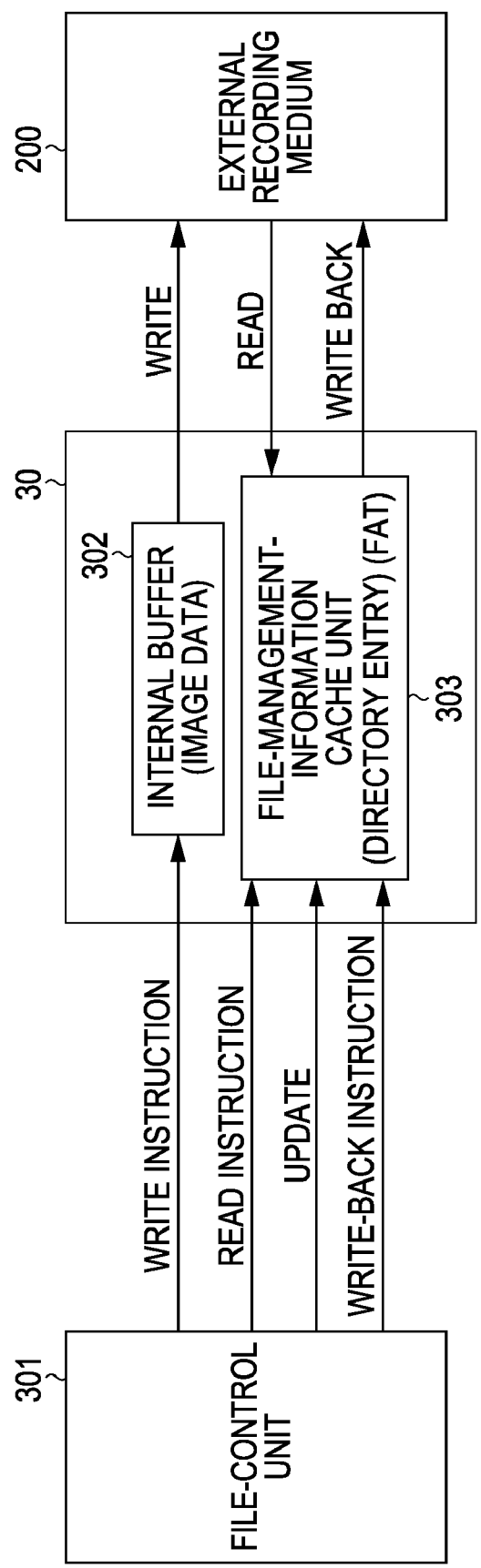
FIG. 3 is a block diagram showing example processing performed, so as to store data into an external recording medium in consecutive-photographing mode according to another embodiment of the present invention.

In FIG. 3, reference numeral 301 denotes a file-control unit which is provided, as part of the system-control unit 50. The file-control unit 301 controls a file system, so as to store an image-data file into the external recording medium 200. Reference numeral 302 denotes an internal buffer and reference numeral 303 denotes a file-management-information cache unit. In the illustrated embodiment, both the internal buffer unit 302 and the file-management-information cache unit 303 are provided in the memory 30. Data on photographed images is accumulated on the internal buffer 302. The file-management-information cache unit 303 stores information about a directory entry 211 and an FAT 203 of the external recording medium 200.

According to an embodiment of the present invention, data writing for the directory entry 211, data writing for main-body data 213, and data writing for the FAT 203 are not performed repeatedly for each file, as in the conventional system. As a substitute of the above-described data writing, the processing efficiency is increased, as described below.

First, in the consecutive-photographing mode, the file-control unit 301 reads and transmits file-management information including the directory entry 211 and the FAT 203 of the external recording medium 200 to the file-management-information cache unit 303. When image data is accumulated on the internal buffer 302 and an instruction to generate a file is issued, the file-control unit 301 performs file opening and updates the directory entry 211 stored in the file-management-information cache unit 303. However, the file-control unit 301 does not write the directory entry 211 into the external recording medium 200. Then, as for the main-body data 213, the file-control unit 301 writes the image data stored in the internal buffer 302 into the external recording medium 200.

When the file is finally closed, the file-control unit 301 does not write data into the external recording medium 200 and only updates the data stored in the file-management-information cache unit 303. The above-described processing is performed repeatedly while the consecutive photographing is performed. When predetermined conditions for determining that the processing is finished are satisfied, the file-management information stored in the file-management-information cache unit 303 is written back into the external recording medium 200. Namely, when photographing is performed over N times in the consecutive-photographing mode, the data writing corresponding to N images is performed for the main-body data 213. Finally, data writing is performed for each of the directory entry 211 and the FAT 203. Namely, in accordance with an embodiment of the present invention, when the image data corresponding to N images is obtained, it is only required that the data writing corresponding to N+2 times be performed.

Thus, the data writing is consecutively performed for the main-body data 213, and the data writing is collectively performed for the directory entry 211 and the FAT 203 at the last stage. Accordingly, data writing can be performed with efficiency in the consecutive-photographing mode which requires high-speed data writing.

First Exemplary Embodiment

Figure 4:
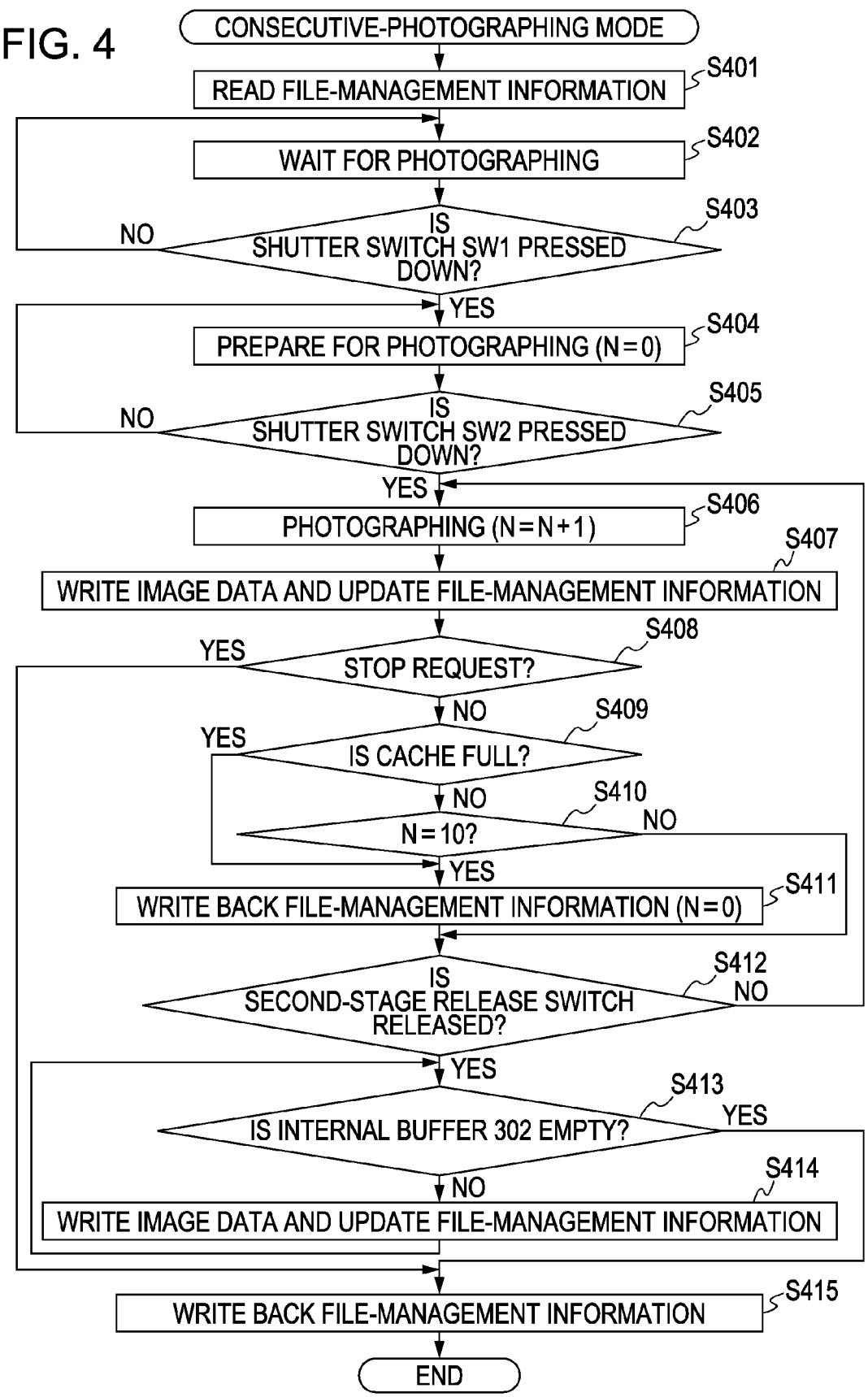
FIG. 4 is a flowchart showing example processing performed in the consecutive-photographing mode corresponding to a first embodiment of the present invention.

Next, the flow of processing procedures performed according to a first embodiment of the present invention will be described in detail with reference to FIG. 4.

When the operation unit 70 of the digital camera 100 is operated and the consecutive-photographing mode is selected, the following processing procedures are performed. Namely, the file-management information including the directory entry 211 and/or the FAT 203 is read and transmitted from the external recording medium 200 to the file-management-information cache unit 303, at step S401. Here, the name of a file included in the directory entry 211 is examined so that the file name does not overlap the name of a file which is generated at the time where the consecutive photographing is performed. If the name of a file which should be generated at the time when the consecutive photographing is performed overlaps the name of the file included in the directory entry 211, the file name is excluded. That is to say, the file name is not used, as the name of the file which should be generated at the time when the consecutive photographing is performed.

The digital camera 100 enters the photographing-wait state, at step S402, and it is determined whether or not the shutter switch SW1 (62) is pressed down, at step S403. If the shutter switch SW1 (62) is pressed down ("YES" at step S403), the processing advances to step S404. If the shutter switch SW1 (62) is not pressed down ("NO" at step S403), the processing returns to step S402 and the photographing-wait state is continued. At step S404, preparations relating to photographing are made. Namely, the range finding-and-photometry processing, the focusing processing, the white-balance processing, and so forth are performed. Additionally, at step S404, the value of a counter (N) indicating the current number of images consecutively photographed is set to zero.

Then, the processing proceeds to step S405 where it is determined whether or not the shutter switch SW2 (64) is pressed down. When the shutter switch SW2 (64) is pressed down ("YES" at step S405), the processing advances to step S406 where photographing processing (sensing an image of a subject and generating image data) including an actual shutter operation, exposure processing, and so forth is performed, such that data on photographed images is accumulated on the internal buffer 302. Additionally, at step S406, the counter N is incremented. Although image-data writing is actually performed, at step S407, only the main-body data of the image data accumulated on the internal buffer 302 is written into the external recording medium 200. The file-management information is added and updated by the file-management-information cache unit 303.

The size of data for writing may be determined in a predetermined unit. Otherwise, the data corresponding to a single image may be written in a single writing operation. If a stop request is generated, at step S408, the processing advances to step S415. The stop request is generated, for example, by the user who wants to change the mode, or by the system when the power consumed by the digital camera is required to be reduced or stopped. For example, the power consumed by the digital camera is required to be reduced or stopped due to a decrease in a remaining battery amount, or when the lid of the battery is opened. At step S415, the file-management information is quickly written back into the external recording medium 200 and the mode is terminated. If a stop request is not generated ("NO" at step S408), the processing advances to step S409.

At step S409, it is determined whether or not a predetermined area of the file-management-information cache unit 303 overflows with information. If it is difficult to further perform addition-and-update processing because the cache unit 303 is full ("YES" at step S409), the processing advances to step S411. Otherwise, if it is possible to add information to the cache unit 303 ("NO" at step S409), the processing advances to step S410.

At step S410, the value of the counter N, that is, the current number of images obtained by performing the consecutive photographing is determined. In the first embodiment of the present invention, a predetermined image number is set to ten. In that case, if the value of the counter N is not ten, it is determined whether or not the shutter switch SW2 (64) is kept being pressed down, at step S412. If the shutter switch SW2 (64) remains pressed down ("NO" at step S412), the processing returns to step S406 and the consecutive photographing is performed again. Subsequently, only the main-body data of the image data is consecutively written into the external recording medium 200.

If the value of the counter N becomes ten ("YES" at step S410), the contents of the file-management-information cache unit 303 are written back into the external recording medium 200, at step S411. Further, at step S411, the value of the counter N is reset to zero. If the contents of the file-management-information cache unit 303 are not written into the external recording medium 200, the image data is not identified by the external recording medium 200, as a file. For solving the above-described problem, the contents are written back into the external recording medium 200 when a predetermined condition is satisfied even though the consecutive photographing is continued. That is to say, the contents are written back into the external recording medium 200 for every predetermined number of images, so as to increase the security of the system. In the first embodiment, the file-management information is written back into the external recording medium 200 for every ten images photographed consecutively. Although in the illustrated embodiment, the number of images consecutively photographed before writing back the filing-management information into the external recording medium is set to ten, it should be understood that this number of images is arbitrary and could be any number (e.g., 5, 15, 20, 25, etc).

When the shutter switch SW2 (64) is released ("YES" at step S412) to terminate the consecutive-photographing mode, the processing proceeds to S413. When the processing advances to steps S413 and S414, the image data is written into the external recording medium 200 till the internal buffer 302 becomes empty, additional data is transmitted to the file-management-information cache unit 303, and the contents of the file-management-information cache unit 303 is updated. If the entire image data is written into the external-recording medium 200 and the internal buffer 302 becomes empty ("YES" at step S413), the processing advances to step S415 where the contents of the file-management-information cache unit 303 is written back into the external-recording medium 200 for the last time, and file saving is finished.

Second Exemplary Embodiment

Figure 5:
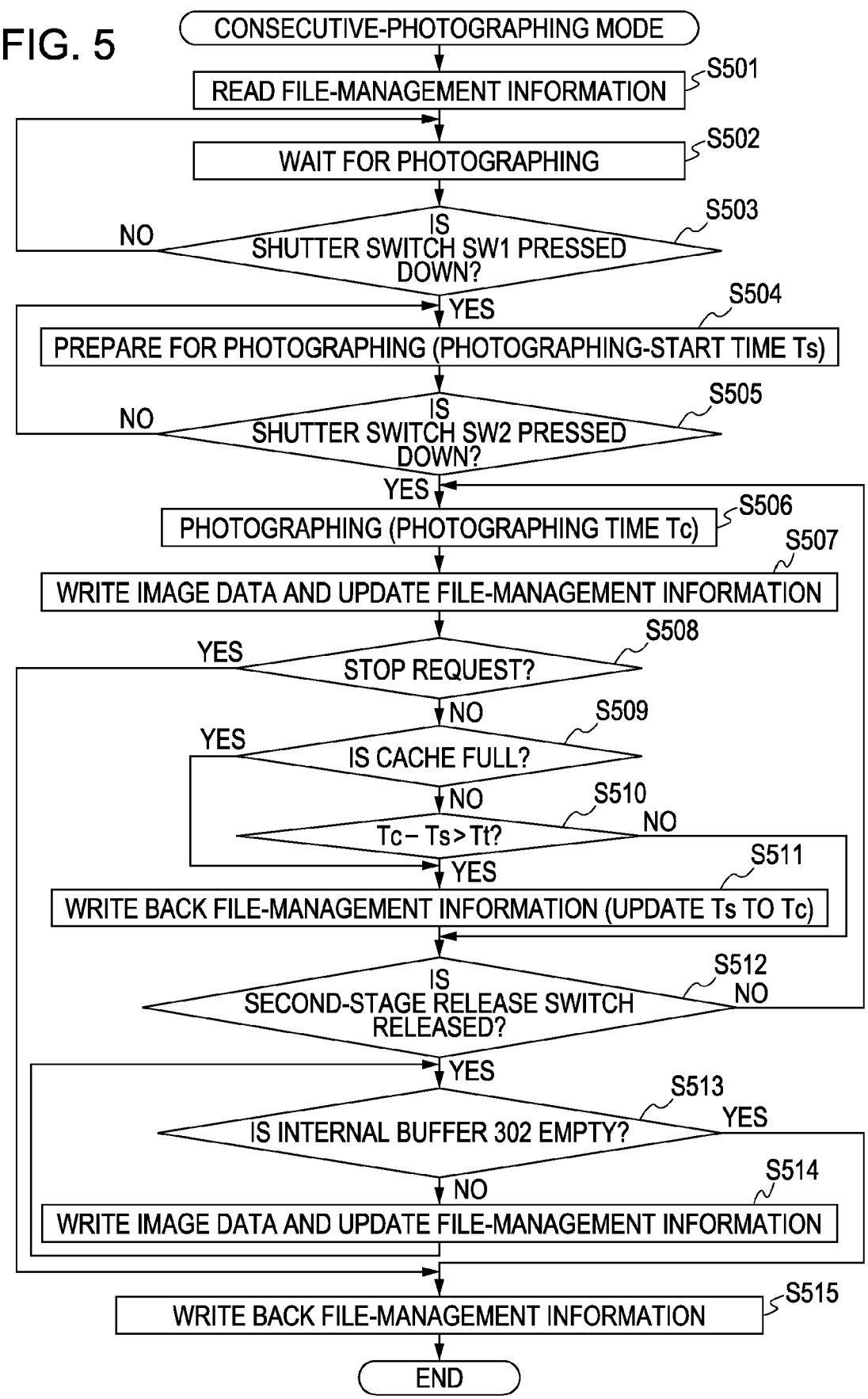
FIG. 5 is a flowchart showing example processing performed in the consecutive-photographing mode corresponding to a second embodiment of the present invention.

A second embodiment of the present invention will be described in detail with reference to FIG. 5.

When the operation unit 70 of the digital camera 100 is operated and the consecutive-photographing mode is selected, the following processing procedures are performed. Namely, the file-management information including the directory entry 211 and/or the FAT 203 is read and transmitted from the external recording medium 200 to the file-management-information cache unit 303, at step S501. Here, the name of a file included in the directory entry 211 is examined so that the file name does not overlap the name of a file which is generated at the time when the consecutive photographing is performed. If the name of a file which should be generated at the time when the consecutive photographing is performed overlaps the name of the file included in the directory entry 211, the file name is excluded, that is to say, the file name is not used, as the name of the file which should be generated at the time when the consecutive photographing is performed.

The digital camera 100 enters the photographing-wait state, at step S502, and it is determined whether or not the shutter switch SW1 (62) is pressed down, at step S503. If the shutter switch SW1 (62) is pressed down ("YES" at step S503), the processing advances to step S504. If the shutter switch SW1 (62) is not pressed down ("NO" at step S503), the processing returns to step S502 and the photographing-wait state is continued. At step S504, preparations relating to photographing are made. Namely, the range finding-and-photometry processing, the focusing processing, the white-balance processing, and so forth are performed. Additionally, at step S504, information about photographing-start time Ts is acquired. Then, the processing proceeds to step S505 where it is determined whether or not the shutter switch SW2 (64) is pressed down. When the shutter switch SW2 (64) is pressed down ("YES" at step S505), the processing advances to step S506 where photographing processing (sensing an image of a subject and generating image data) including an actual shutter operation, exposure processing, and so forth is performed, such that data on photographed images is accumulated on the internal buffer 302. Additionally, at step S506, information about photographing time Tc is acquired.

Although image-data writing is actually performed, at step S507, only the main-body data of the image data accumulated on the internal buffer 302 is written into the external recording medium 200. Addition-and-update processing is performed for the file-management information in the file-management-information cache unit 303. The size of data for writing may be determined in a predetermined unit. Otherwise, the data corresponding to a single image may be written at one time. If a stop request is generated, at step S508, the processing advances to step S515. The stop request is generated, for example, by the user who wants to change the mode, or the system when the power thereof should be stopped. For example, the power should be stopped due to a decrease in a remaining battery amount, or when the lid of the battery is opened. At step S515, the file-management information is quickly written back into the external recording medium 200 and the mode is terminated. If a stop request is not generated ("NO" at step S508), the processing advances to step S509.

At step S509, it is determined whether or not a predetermined area of the file-management-information cache unit 303 overflows with information. If it is difficult to further perform the addition-and-update processing because the cache unit 303 is full ("YES" at step S509), the processing advances to step S511. Otherwise, if it is possible to add information to the cache unit 303 ("NO" at step S509), the processing advances to step S510. At step S510, information about a photographing interval is acquired on the basis of the difference between the photographing-start time Ts and the final photographing time Tc. If the time corresponding to the photographing interval falls within the range of a predetermined time Tt ("NO" at step S510), it is determined whether or not the shutter switch SW2 (64) is kept being pressed down at step S512. If the shutter switch SW2 (64) remains pressed down ("NO" at step S512), the processing returns to step S506 and the consecutive photographing is performed again. Subsequently, only the main-body data of the image data is consecutively written into the external recording medium 200.

If the time corresponding to the photographing interval does not fall within the range of the predetermined time Tt ("YES" at step S510), the contents of the file-management-information cache unit 303 are written back into the external recording medium 200, at step S511. Further, at step S511, the value of the photographing time Tc is set to the photographing-start time Ts. If the contents of the file-management-information cache unit 303 are not written into the external recording medium 200, the image data is not identified, as a file, by the external recording medium 200. For solving the above-described problem, the contents are written back into the external recording medium 200 when a predetermined condition is satisfied even though the consecutive photographing is continued. That is to say, the contents are written back into the external recording medium 200 every time a predetermined time elapses, so as to increase the security of the system.

Then, the shutter switch SW2 (64) is released, at step S512 so that the consecutive-photographing mode is terminated. Then, the processing advances to steps S513 and S514 where the image data is written into the external recording medium 200 till the internal buffer 302 becomes empty, and addition-and-update processing is performed for the contents of the file-management-information cache unit 303. If the entire image data is written into the external-recording medium 200 and the internal buffer 302 becomes empty, the processing advances to step S515 where the contents of the file-management-information cache unit 303 is written back into the external-recording medium 200, and file saving is finished.

Third Exemplary Embodiment

A third embodiment of the present invention will be described in detail with reference to FIG. 6.

When the operation unit 70 of the digital camera 100 is operated and the consecutive-photographing mode is selected, the following processing procedures are performed. Namely, the file-management information including the directory entry 211 and/or the FAT 203 is read and transmitted from the external recording medium 200 to the file-management-information cache unit 303, at step S601. Here, the name of a file included in the directory entry 211 is examined so that the file name does not overlap the name of a file generated at the time when the consecutive photographing is performed. If the name of a file which should be generated at the time when the consecutive photographing is performed overlaps the name of the file included in the directory entry 211, the file name is excluded, that is to say, the file name is not used, as the name of the file which should be generated at the time when the consecutive photographing is performed.

The digital camera 100 enters the photographing-wait state, at step S602, and it is determined whether or not the shutter switch SW1 (62) is pressed down, at step S603. If the shutter switch SW1 (62) is pressed down ("YES" at step S603), the processing advances to step S604. If the shutter switch SW1 (62) is not pressed down ("NO" at step S603), the processing returns to step S602 and the photographing-wait state is continued. At step S604, preparations relating to photographing are made. Namely, the range finding-and-photometry processing, the focusing processing, the white-balance processing, and so forth are performed. Additionally, at step S604, a size counter S which calculates the capacity of a photographed image size is reset to zero.

Then, the processing proceeds to step S605 where it is determined whether or not the shutter switch SW2 (64) is pressed down. When the shutter switch SW2 (64) is pressed down ("YES" at step S605), the processing advances to step S606 where photographing processing (sensing an image of a subject and generating image data) including an actual shutter operation, exposure processing, and so forth is performed, such that data on photographed images is accumulated on the internal buffer 302. Although image-data writing is actually performed, at step S607, only the main-body data of the image data accumulated on the internal buffer 302 is written into the external recording medium 200. Addition-and-update processing is performed for the file-management information in the file-management-information cache unit 303. The size of data for writing may be determined in a predetermined unit. Otherwise, the data corresponding to a single image may be written at one time. Here, the value of a data size Sc indicating the size of the photographed image data is added to that of the size counter S. If a stop request is generated, at step S608, the processing advances to step S615. The stop request is generated, for example, by the user who wants to change the mode, or the system when the power thereof should be stopped. For example, the power should be stopped due to a decrease in a remaining battery amount, or when the lid of the battery is opened. At step S615, the file-management information is quickly written back into the external recording medium 200 and the mode is terminated. If a stop request is not generated ("NO" at step S608), the processing advances to step S609.

At step S609, it is determined whether or not a predetermined area of the file-management-information cache unit 303 overflows with information. If it is difficult to further perform the addition-and-update processing because the cache unit 303 is full ("YES" at step S609), the processing advances to step S611. Otherwise, if it is possible to add information to the cache unit 303 ("NO" at step S609), the processing advances to step S610. If the value of the size counter S does not exceed a predetermined size St ("NO" at step S610), it is determined whether or not the shutter switch SW2 (64) is kept being pressed down, at step S612. If the shutter switch SW2 (64) remains pressed down ("NO" at step S612), the processing returns to step S606 and the consecutive photographing is performed again. Subsequently, only the main-body data of the image data is consecutively written into the external recording medium 200.

If the value of the size counter S exceeds the predetermined size St ("YES" at step S610), the contents of the file-management-information cache unit 303 are written back into the external recording medium 200, at step S611. Further, at step S611, the value of the size counter S is reset. If the contents of the file-management-information cache unit 303 are not written into the external recording medium 200, the image data is not identified, as a file, by the external recording medium 200. For solving the above-described problem, the value of the size counter S is reset every time the value of the size counter S exceeds the predetermined size St. That is to say, the contents are written back into the external recording medium 200 every time the value of the size counter S exceeds the predetermined size St, so as to increase the security of the system.

When the shutter switch SW2 (64) is released ("YES" at step S612) to terminate the consecutive-photographing mode, the processing proceeds to S613. When the processing advances to steps S613 and S614, the image data is written into the external recording medium 200 till the internal buffer 302 becomes empty, and addition-and-update processing is performed for the contents of the file-management-information cache unit 303. If the entire image data is written into the external-recording medium 200 and the internal buffer 302 becomes empty ("YES" at step S613), the processing advances to step S615 where the contents of the file-management-information cache unit 303 is written back into the external-recording medium 200 for the last time, and file saving is finished.

Thus, according to the third embodiment, file opening, data writing, and file closing are not performed for each file in the consecutive-photographing mode. In place of performing the above-described processing, the data writing corresponding to a plurality of images is continuously performed and the file-management information is written back into the external recording medium 200 under predetermined conditions, so that the number of data writing performed for the external recording medium 200 is significantly reduced. For example, where the consecutive photographing is performed over N times, the number of data writing is reduced to N+2 from N*4. Further, since the image data is consecutively written into the external recording medium 200, the performance of the external recording medium 200 is increased, which allows for saving a data file with efficiency. Subsequently, it becomes possible to increase the operability achieved when the consecutive-photographing mode is selected. Further, it becomes also possible to photograph many images consecutively in the consecutive-photographing mode by using a limited internal buffer area and/or a low-speed external recording medium. According to embodiments of the present invention, it becomes possible to reduce the number of data writing performed for an external recording medium when an image-data file is stored into the external recording medium in the consecutive-photographing mode. Therefore, it becomes possible to write data into a file system with efficiency.

It is to be understood that the present invention can also be achieved by supplying a storage medium (or a recording medium) storing program code of software for implementing the functions of the above-described embodiments, to a system or an apparatus so that a computer (CPU, MPU, etc.) of the system or apparatus reads and executes the program code stored in the storage medium. In that case, the program code itself, read from the storage medium, achieves the functions of the above-described embodiments, and thus the storage medium storing the program code constitutes the present invention. Further, the functions of the above-described embodiments are achieved not only by the computer reading and executing the program code. Namely, an operating system (OS) or the like running on the computer executes part of or the entire processing on the basis of an instruction of the program code, whereby the functions of the above-described embodiments are achieved.

In another embodiment of the present invention, the program code read from the storage medium may be written into a memory of a function extension card inserted in the computer or a function extension unit connected to the computer. The functions of the above-described embodiments may be realized by executing part of or the entire process by a CPU, etc. of the function extension card or the function extension unit on the basis of an instruction of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-209156 filed Jul. 19, 2005, which is hereby incorporated by reference herein in its entirety.

What is claimed is:

1. An image-processing device comprising:
   an image-pickup unit configured to generate image data by shooting an object in accordance with a shooting instruction;
   an interface to which a recording medium configured to record an image file and file-management information is connected, the file-management information including an image file name, a recorded position and a record size of the image file;

an internal memory configured to store the image data generated by the image-pickup unit and the file-management information read from the recording medium; and a control unit configured, when consecutive-photographing of a plurality of still images is instructed, to generate an image file from the image data stored in the internal memory, to record the generated image file in the recording medium, and to update the file-management information stored in the internal memory based on the generated image file, each time a still image is photographed, and to update the file-management information stored in the recording medium, using the updated file-management information, after the consecutive-photographing of a plurality of still images is finished, wherein during the consecutive-photographing of a plurality of still images, the control unit updates the file-management information recorded in the recording medium, using the updated file-management information stored in the internal memory, when a predetermined condition is satisfied, and the control unit does not update the file-management information recorded in the recording medium when the predetermine condition is not satisfied, and wherein the predetermined condition is that a predetermined number of still images are photographed by performing the consecutive-photographing of a plurality of still images.

2. The image-processing device according to claim 1, wherein the consecutive-photographing of a plurality of still images is performed while a predetermined button is being pressed, and the consecutive-photographing of a plurality of still images is finished when pressing the button is stopped.

3. The image-processing device according to claim 1, further comprising:

an operation unit configured to receive an operation to select a mode of the image-pickup unit, wherein the consecutive-photographing of a plurality of still images is performed when a consecutive-photographing mode is selected by the operation unit.

4. A method of controlling an image-processing device having an interface to which a recording medium configured to record an image file and file-management information is connected, the file-management information including an image file name, a recorded position and a record size of the image file and an internal memory configured to store the image data generated by the image-pickup unit and the file-management information read from the recording medium, the method comprising:

generating, by a control unit configured, when consecutive-photographing of a plurality of still images is instructed, an image file from the image data stored in the internal memory, recording the generated image file in the recording medium, and updating the file-management information stored in the internal memory based on the generated image file, each time a still image is photographed, and updating the file-management information stored in the recording medium, using the updated file-management information, after the consecutive-photographing of a plurality of still images is finished, wherein during the consecutive-photographing of a plurality of still images, updating, by the control unit, the file-management information recorded in the recording medium, using the updated file-management information stored in the internal memory, when a predetermined condition is satisfied, and not updating, by the control unit, the file-management information recorded in the recording medium when the predetermine condition is not satisfied, and wherein the predetermined condition is that a predetermined number of still images are photographed by performing the consecutive-photographing of a plurality of still images.

* * * * *